(12) United States Patent
Garg

(10) Patent No.: US 7,680,229 B2
(45) Date of Patent: Mar. 16, 2010

(54) METHOD OF DETERMINING A SYNCHRONOUS PHASE

(75) Inventor: Rahul Garg, Faridabad (IN)

(73) Assignee: Freescale Semiconductor, Inc., Austin, TX (US)

( * ) Notice: Subject to any disclaimer, the term of this patent is extended or adjusted under 35 U.S.C. 154(b) by 602 days.

(21) Appl. No.: 11/693,705

(22) Filed: Mar. 29, 2007

(65) Prior Publication Data

US 2007/0230633 A1 Oct. 4, 2007

(30) Foreign Application Priority Data

Apr. 3, 2006 (IN) .......................... 938/DEL/2006

(51) Int. Cl.
*H04L 7/00* (2006.01)
*H04L 27/06* (2006.01)

(52) U.S. Cl. ..................................... 375/365; 375/343

(58) Field of Classification Search ................. 375/140, 375/142, 145, 147, 150–151, 296, 343, 346, 375/354, 362–366; 370/503, 509–514
See application file for complete search history.

(56) References Cited

U.S. PATENT DOCUMENTS

| 6,504,883 | B1 * | 1/2003 | Morimoto et al. ........... 375/343 |
| 6,765,973 | B1 | 7/2004 | Miller et al. |
| 6,847,676 | B1 * | 1/2005 | Ng et al. ..................... 375/142 |
| 7,149,240 | B2 * | 12/2006 | McDonough et al. ....... 375/146 |
| 2005/0207479 | A1 * | 9/2005 | Ruprich et al. .............. 375/150 |

* cited by examiner

*Primary Examiner*—Tesfaldet Bocure
*Assistant Examiner*—Lawrence B Williams
(74) *Attorney, Agent, or Firm*—Charles Bergere

(57) ABSTRACT

A method of determining a synchronous phase includes receiving a correlation sequence, and selecting one or more correlated signals from the correlation sequence. Then, when the number of selected correlated signals is odd, the synchronous phase corresponding to a central correlated signal is selected.

20 Claims, 4 Drawing Sheets

METHOD OF DETERMINING A SYNCHRONOUS PHASE

BACKGROUND OF THE INVENTION

The present invention relates generally to phase selection, and more specifically, to a method of determining a synchronous phase from a correlation sequence.

Communication in electronic devices such as mobile phones, laptop computers, Personal Digital Assistants (PDAs), cameras, and so forth, can be asynchronous or synchronous. In asynchronous communication, a transmitter clock and a receiver clock are independent and are not synchronized. There are various standards, such as the Third Generation Digital Baseband/Radio Frequency (3GDigRF) standard, for asynchronous communication. The 3GDigRF standard defines an efficient physical interconnection between a transmitter and a receiver, such as a Baseband Integrated Circuit (BBIC) and a Radio Frequency Integrated Circuit (RFIC) for electronic devices. The 3GDigRF standard ensures that integrated circuits (IC) complying with the standard, when correctly configured, can communicate with each other. Such communication requires acquisition of phase by selecting a phase corresponding to a correlator signal. This phase acquisition ensures synchronization before the data can be recovered from a received signal. The phase acquisition is carried out using a known sequence such as a Post Office Code Standardization Advisory Group (POCSAG) sequence, which is a basic signaling pattern with a sequence of coded binary data such as '1010100001001011', which facilitates transmission in a single-batch.

The phase acquisition technique can suffer from a bias if the phases for synchronization are not resolved correctly. This can limit the duration of the packet transfer with a required Bit Error Rate (BRR). This can also limit the rate of transfer of the packet.

An existing technique carries out the synchronization by observing edge transitions and then performing the centering using the set-up and hold-time information. The technique does not address bias removal or the conflicted centering of phase selection. Thus, it would be desirable to have an accurate phase acquisition technique.

BRIEF DESCRIPTION OF THE DRAWINGS

The following detailed description of preferred embodiments of the present invention will be better understood when read in conjunction with the appended drawings. The present invention is illustrated by way of example and not limited by the accompanying figures, in which like references indicate similar elements.

DETAILED DESCRIPTION OF THE PRESENT INVENTION

Figure 1:
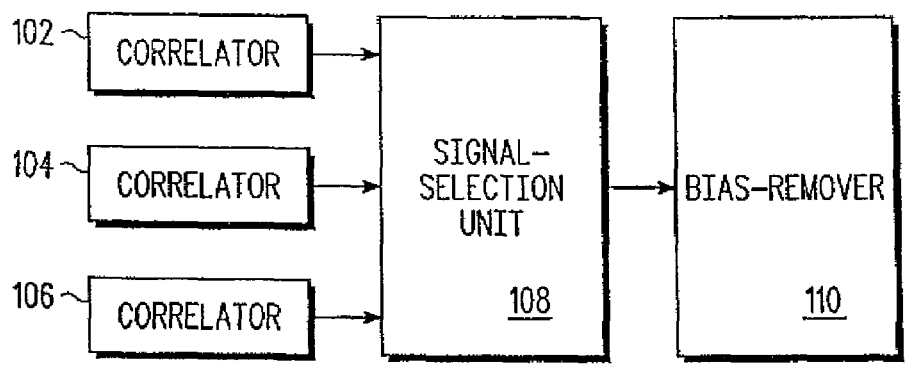
FIG. 1 is a schematic block diagram of a synchronous phase selector in accordance with an embodiment of the present invention.

The detailed description in connection with the appended drawings is intended as a description of the presently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method of determining a synchronous phase is provided. The method includes receiving a correlation sequence and selecting one or more correlated signals from the correlation sequence. Thereafter, the synchronous phase corresponding to a central correlated signal from the one or more selected correlated signals is selected, when the number of the one or more selected correlated signals is odd.

In another embodiment of the present invention, a method of determining a synchronous phase from a correlation sequence is provided. The method includes receiving a correlation sequence and selecting one or more blocks of correlated signals from the correlation sequence. Thereafter, the synchronous phase corresponding to a first correlated signal from a central block of the one or more blocks is selected, based on the first predefined criteria, when the number of the one or more blocks is odd. The method also includes selecting the synchronous phase corresponding to a second correlated signal from either a first-central block or a second-central block, based on the second predefined criteria, when the number of the one or more blocks is even.

In yet another embodiment of the present invention, the present invention provides a method of determining a synchronous phase from a correlation sequence. The method includes receiving a correlation sequence and selecting one or more correlated signals of the correlation sequence, which are greater than a first predetermined value. Thereafter, the synchronous phase corresponding to a central correlated signal from the selected correlated signals is selected, when the number of the selected correlated signals is odd. The method also includes selecting the synchronous phase corresponding to a first correlated signal from the selected correlated signals, when the number of the selected correlated signals is even.

Embodiments of the present invention provide a method of determining a synchronous phase. The method increases the accuracy in selecting the synchronous phase. The signal-to-noise ratio (SNR) of the selected synchronous phase is also improved. The method also reduces the bit error rate (BER). Moreover, during phase drift, the method reduces the possibility of going beyond the eye-diagram specification, which requires that the selection of synchronous phase be within the limits from an ideal synchronous phase point. The method also enables a reduction in the number of phases used for selecting the synchronous phase. This reduction results in lower Phase Lock Loop (PLL) clock requirements, saving area and power in the circuit.

Referring now to FIG. 1, a schematic block diagram of a synchronous phase selector 100 in accordance with an embodiment of the present invention is shown. The synchronous phase selector 100 can be present in an Integrated Circuit (IC), for example, a Base Band Integrated Circuit (BBIC), a Radio Frequency Integrated Circuit (RFIC), and so forth. In one embodiment of the present invention, the synchronous phase selector 100 selects the synchronous phase to transfer a data packet between a RFIC and a BBIC. In another embodiment of the present invention, the synchronous phase selector 100 selects the synchronous phase for an asynchronous transfer of data packets between the RFIC and the BBIC. Typically, the asynchronous transfer of data between the RFIC and the BBIC is in accordance with 3GDigRF. Therefore, the asynchronous transfer requires the selection of the synchronous phase before the data can be recovered. In an embodiment of the present invention, the data packet includes a sync, a header, and a payload. Typically, the sync is the POCSAG sequence, which is a 16-bit binary sequence with the bits '1010100001001011'. The header includes one or more flags, address fields, and so forth. The payload includes data to be transferred between the BBIC and the RFIC. In an embodiment of the present invention, selection of the synchronous phase is performed after the data is received from a line receiver.

The synchronous phase selector 100 includes a plurality of correlators. For the purpose of this description, the synchronous phase selector 100 has three correlators 102, 104, and 106. The synchronous phase selector 100 also includes a signal-selection unit 108 and a bias-remover 110. In an embodiment of the present invention, each of the correlators 102, 104 and 106 are digital correlators. Each of the correlators 102, 104 and 106 receives an input bit through the line receiver, correlates the received bit with a corresponding bit of the POCSAG sequence, and determines a correlation value, based on the values of the input bit and the corresponding bit of the POCSAG sequence. In an embodiment of the present invention, when the value of the input bit and the corresponding bit of the POCSAG sequence is the same, the determined correlation value is set to '1'. Similarly, when the value of the input bit and the corresponding bit of the POCSAG sequence are different, the determined correlation value is set to '0'. Therefore, for a sync of the data packet, each of the correlators 102, 104 and 106 determines the correlation values corresponding to each bit of the POCSAG sequence. After correlating each bit of the sync of the data packet with the POCSAG sequence, each correlator provides a correlated signal. For example, in an embodiment of the present invention, the sync is '1001100001001011' for correlator 102. In this embodiment, when the sync is correlated with the POCSAG sequence ('1010100001001011'), the sequence of the correlation values is '1100111111111111'. The signal value of the output of the correlator 102 is 14 (1+1+0+0+1+1+1+1+1+1+1+1+1+1+1+1=14). In an embodiment of the present invention, the signal values of the output of the correlators 102, 104 and 106 form a correlation sequence.

The correlators 102, 104 and 106 are coupled to the signal selection unit 108 and provide the correlation sequence to the signal-selection unit 108. The signal-selection unit 108 selects one or more correlated signals from the plurality of correlation sequences. The one or more selected correlated signals are equal to maxima. The maxima are the maximum value of the correlation sequence. In another embodiment of the present invention, the one or more correlated signals are selected when their value is greater than a first predetermined value. In yet another embodiment of the present invention, the one or more correlated signals are selected when they are greater than the first predetermined value and are equal to the maxima.

The signal-selection unit 108 is operatively coupled to the bias-remover 110. The bias-remover 110 selects the synchronous phase corresponding to a correlated signal from among the one or more correlated signals, based on the number of the one or more correlated signals.

Figure 2:
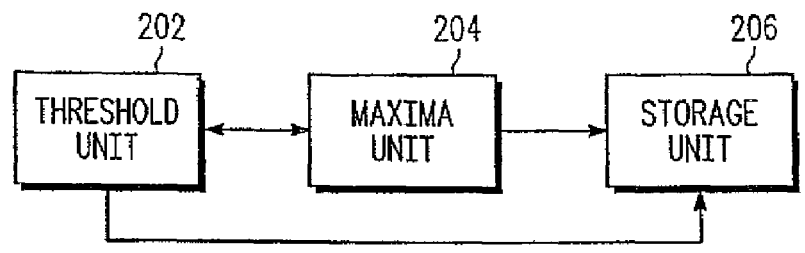
FIG. 2 is a schematic block diagram of a signal-selection unit in accordance with an embodiment of the present invention.

Referring now to FIG. 2, a block diagram of a signal-selection unit 108 in accordance with an embodiment of the present invention is shown. The signal-selection unit 108 includes a threshold unit 202, a maxima unit 204, and a storage unit 206. The threshold unit 202 provides the predetermined threshold value for selecting the one or more correlated signals from the plurality of correlated signals. The predetermined threshold value is a register programmable value. The threshold unit 202 performs a comparison of the correlated signals with the predetermined threshold value. The maxima unit 204 is coupled to the threshold unit 202 and determines the maxima for selecting the one or more correlated signals from among the plurality of correlated signals. In one embodiment of the invention, the maxima unit 204 is a binary comparator chain. The storage unit 206 is coupled to the threshold unit 202 and the maxima unit 204. The storage unit 206 stores the location of the one or more correlated signals. The storage unit 206 preferably comprises one or more registers. However, other storage devices could be used. For example, the storage unit 206 could be a block of memory or a designated area of an embedded type memory.

Figure 3:
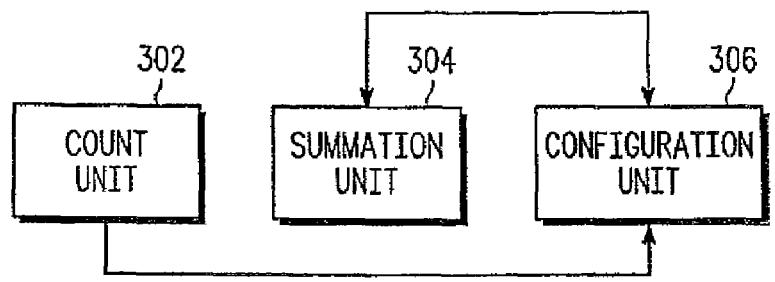
FIG. 3 is a schematic block diagram of a bias-remover in accordance with an embodiment of the present invention.

Referring now to FIG. 3, a block diagram of the bias-remover 110 is shown. The bias-remover 110 includes a count unit 302, a summation unit 304, and a configuration unit 306. The count unit 302 determines the number of the one or more selected correlated signals. The count unit 302 also determines whether the number of the one or more correlated signals is even or odd. The summation unit 304 determines the sum of the correlated signals of a first and second set of correlated signals. The first set of correlated signals includes the correlated signals preceding a first-central correlated signal, when the number of the one or more correlated signals is even. The second set of correlated signals includes the correlated signals succeeding a second-central correlated signal, when the number of the one or more correlated signals is even. In one embodiment of the invention, the summation unit 304 comprises an adder and one or more registers. The configuration unit 306 is coupled to the count unit 302 and the summation unit 304, and determines a configuration parameter for selecting the one or more correlated signals. The configuration parameter sets the number of correlated signals to be used in the summation unit 304. The configuration unit 306 is also used to compare the sum of first and second set of correlated signals to determine the selected correlated signal.

Figure 4:
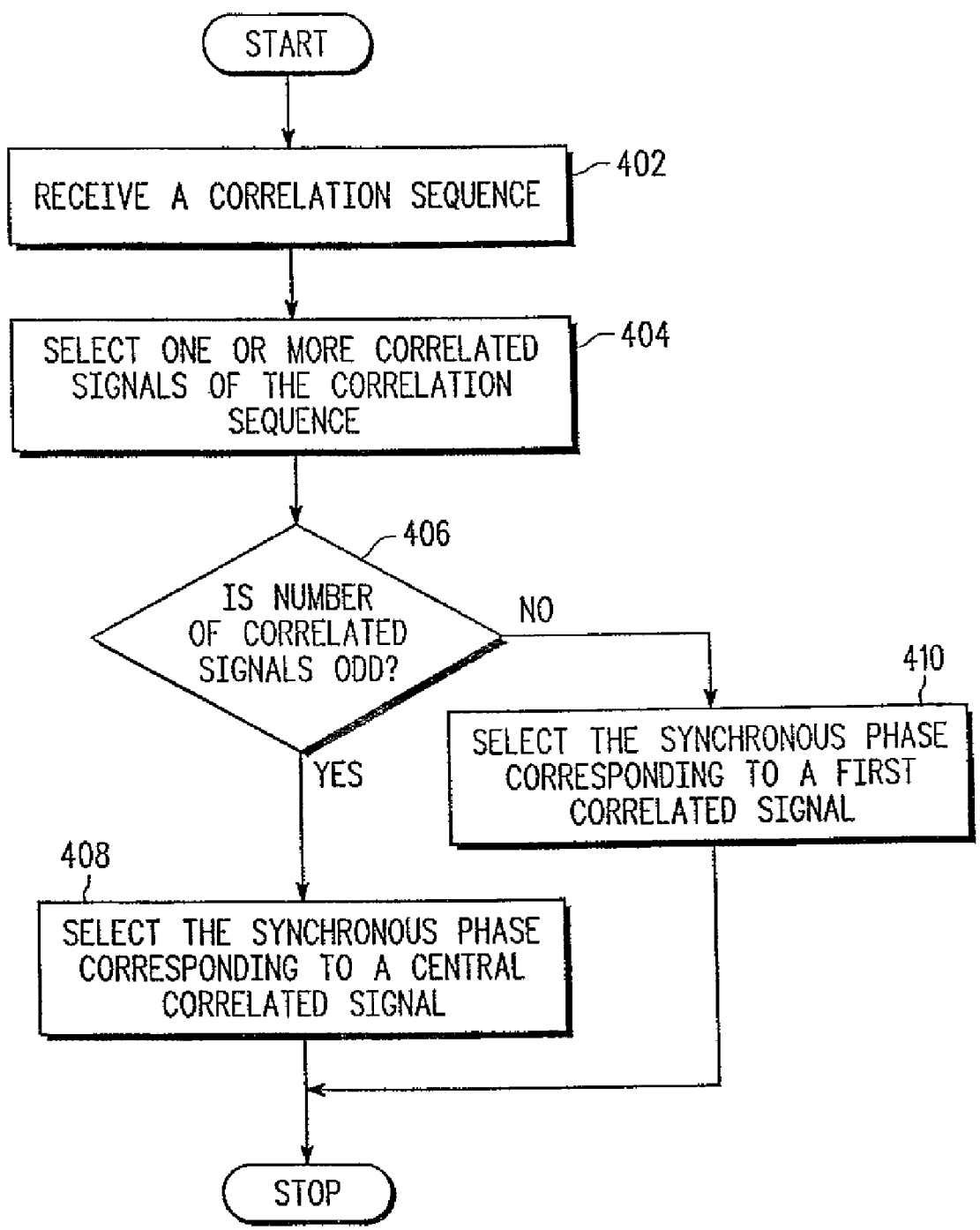
FIG. 4 shows a flowchart depicting a method of determining a synchronous phase in accordance with an embodiment of the present invention.

FIG. 4 is a flowchart depicting a method of determining the synchronous phase in accordance with an embodiment of the present invention. At step 402, a correlation sequence is received. Typically, the correlation sequence is received by the signal-selection unit 108. The correlation sequence includes a plurality of correlated signals of the output of the correlators 102, 104 and 106. In an embodiment of the present invention, prior to receiving the correlation sequence, the synchronous phase selector 100 receives a synchronization sequence, which includes a plurality of bits. Each bit of the synchronization sequence is sampled to obtain a sampling sequence. The correlators 102, 104 and 106 correlate the sampled sequence with the predefined sequence, such as the POCSAG sequence, to generate the correlation sequence.

At step 404, the signal selection unit 108 selects one or more correlated signals of the correlation sequence. Typically, the one or more correlated signals are contiguous. In one embodiment of the invention, the selection unit 108 selects the correlated signals by comparing the correlated signals against the predetermined threshold; in another embodiment, by taking the maxima of the correlated signals;

and in a further embodiment, by both threshold comparison and maxima determination. At step 406, it is determined whether the number of the one or more selected correlated signals is odd. The bias-remover 110 determines whether the number of the one or more selected correlated signals is odd. If it is determined at step 406 that the number of the one or more selected correlated signals is odd, then at step 408, a synchronous phase corresponding to a central correlated signal is selected from the one or more correlated signals by the bias-remover 110. The number of selected correlated signals are counted. When there is an odd number of selected correlated signals, a middle phase of the selected correlated signal is determined, for instance, by division.

If it is determined at step 406 that the number of the one or more selected correlated signals is not odd, then at step 410, a synchronous phase corresponding to a first correlated signal is selected from the one or more selected correlated signals. The synchronous phase is selected based on the correlation values of an even set of the one or more selected correlated signals. The even set includes the correlated signals of the first set and the second set. The first set is the correlated signals preceding the first central correlated signal, and second set is the correlated signals succeeding the second central correlated signals. Typically, a first central correlated signal and a second central correlated signal are determined from the one or more selected correlated signals. For example, in an embodiment of the present invention that has eight correlators, then the selected one or more correlated signals are output from the first, third, fifth and seventh correlators. In this embodiment, the correlated signal corresponding to the third correlator is the first-central correlated signal, and the correlated signal corresponding to the fifth correlator is the second-central correlated signal. A configuration parameter is determined for the first-central correlated signal and the second-central correlated signal. Typically, the configuration parameter has a predetermined value. The configuration parameter determines how many correlated values of the first and second set are used in the next step of selection.

Thereafter, a first sum is determined, which is the sum of the correlation values of the first set of correlated signals from the even set of correlated signals. The first set of correlated signals includes the correlated signals preceding the first-central correlated signal. The number of correlated signals in the first set of correlated signals is based on the configuration parameter. For example, the first set of correlated signals corresponding to the third correlator are the correlated signals corresponding to the first and second correlator, when the configuration parameter is two and the correlated signal corresponding to the third correlator is selected as the first-central correlated signal. Similarly, a second sum is determined, which is the sum of the correlation values of the second set of correlated signals from the even set of correlated signals. The second set of correlated signals includes the correlated signals succeeding the second-central correlated signal. The number of correlated signals in the second set of correlated signals is based on the configuration parameter. For example, the second set of correlated signals corresponding to the fifth correlator are the correlated signals corresponding to the sixth and seventh correlator, when the configuration parameter is two and the correlated signals corresponding to the fifth correlator is selected as the second-central correlated signal. In an embodiment of the present invention, the synchronous phase corresponding to the first-central correlated signal is determined when the first sum is greater than the second sum. In another embodiment of the present invention, the synchronous phase corresponding to the second-central correlated signal is determined when the second sum is greater than the first sum.

In one embodiment of the invention, when the first sum is equal to the second sum the synchronous phase corresponding to the first-central correlated signal is selected when the synchronous phase corresponding to the second-central correlated signal was selected in a preceding selection of the synchronous phase. The synchronous phase corresponding to the second-central correlated signal is selected when the synchronous phase corresponding to the first-central correlated signal was selected in the preceding selection of the synchronous phase.

In another embodiment of the invention, when the first sum is equal to the second sum a first count and a second count is determined, after determining the first-central correlated signal and the second-central correlated signal from the one or more correlated signals. The first count is the number of correlated signals of a first set of the selected correlated signals with correlation values that are greater than a predetermined threshold value. The second count is a number of correlated signals of the second set of the selected correlated signals, with correlation values that are greater than the predetermined threshold value. In this embodiment, the synchronous phase corresponding to the first-central correlated signal is selected if the first count is greater than the second count. The synchronous phase corresponding to the second-central correlated signal is selected when the second count is greater than the first count.

In an embodiment of the present invention, the first count is equal to the second count. In this embodiment, the synchronous phase corresponding to the first-central correlated signal is selected when the synchronous phase corresponding to the second-central correlated signal was selected in a preceding selection of the synchronous phase. The synchronous phase corresponding to the second-central correlated signal is selected when the synchronous phase corresponding to the first-central correlated signal was selected in the preceding selection of the synchronous phase. In this embodiment, the configuration parameter is determined for the first-central correlated signal and the second-central correlated signal. The selection of the synchronous phase, as one of the first-central and second-central correlated signals, is based on the configuration parameter.

In an embodiment of the present invention, a re-correlation sequence is received when the correlation value of each of the one or more correlated signals is less than the predetermined threshold value. Typically, the re-correlation sequence is received by the signal-selection unit 108, for instance, by sampling the bits received on the interface.

Figure 5:
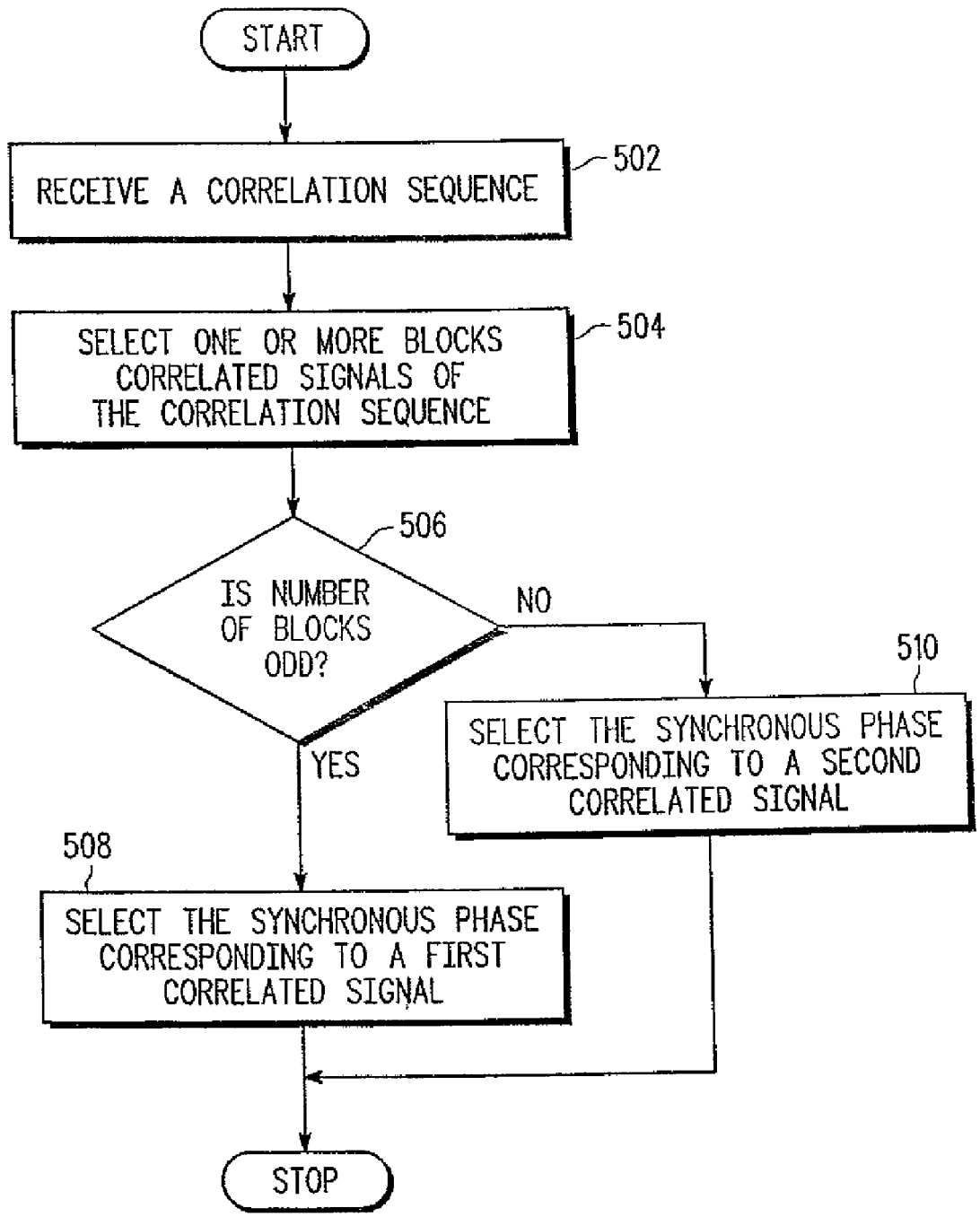
FIG. 5 shows a flowchart depicting a method of determining a synchronous phase in accordance with another embodiment of the present invention.

FIG. 5 is a flowchart depicting a method of determining the synchronous phase in accordance with another embodiment of the present invention. At step 502, the signal-selection unit 108 receives the correlation sequence from the correlators 102, 104 and 106. The correlation sequence includes a plurality of the correlated signals of the output of the plurality of correlators 102, 104 and 106.

At step 504, the signal-selection unit 108 selects one or more blocks of the correlated signals of the correlation sequence. Each block of the correlated signals includes one or more contiguous correlated signals. In an embodiment of the present invention, the one or more correlated signals are maxima. In another embodiment of the present invention, the one or more contiguous correlated signals are greater than a first predetermined value. Typically, the one or more correlated signals of each selected block of correlated signals are contiguous.

At step 506, it is determined whether the number of one or more blocks of correlated signals is odd by the bias-remover 110. If it is determined at step 506 that the number of the one or more blocks of correlated signals is odd, then at step 508, a synchronous phase corresponding to a first correlated signal from a central block of the one or more blocks of correlated signals is selected, based on the first predefined criteria. The predefined criteria are defined as in steps 406, 408 and 410. The synchronous phase corresponding to the first correlated signal is selected by the bias-remover 110. In an embodiment of the present invention, the first correlated signal is selected from the one or more selected correlated signals, as described in steps 406, 408 and 410 of FIG. 4.

If it is determined at step 506 that the number of the one or more blocks of correlated signals is not odd, then at step 510, a synchronous phase corresponding to a second correlated signal from either a first-central block or a second-central block is selected, based on second predefined criteria, by the bias remover 110.

Figure 6:
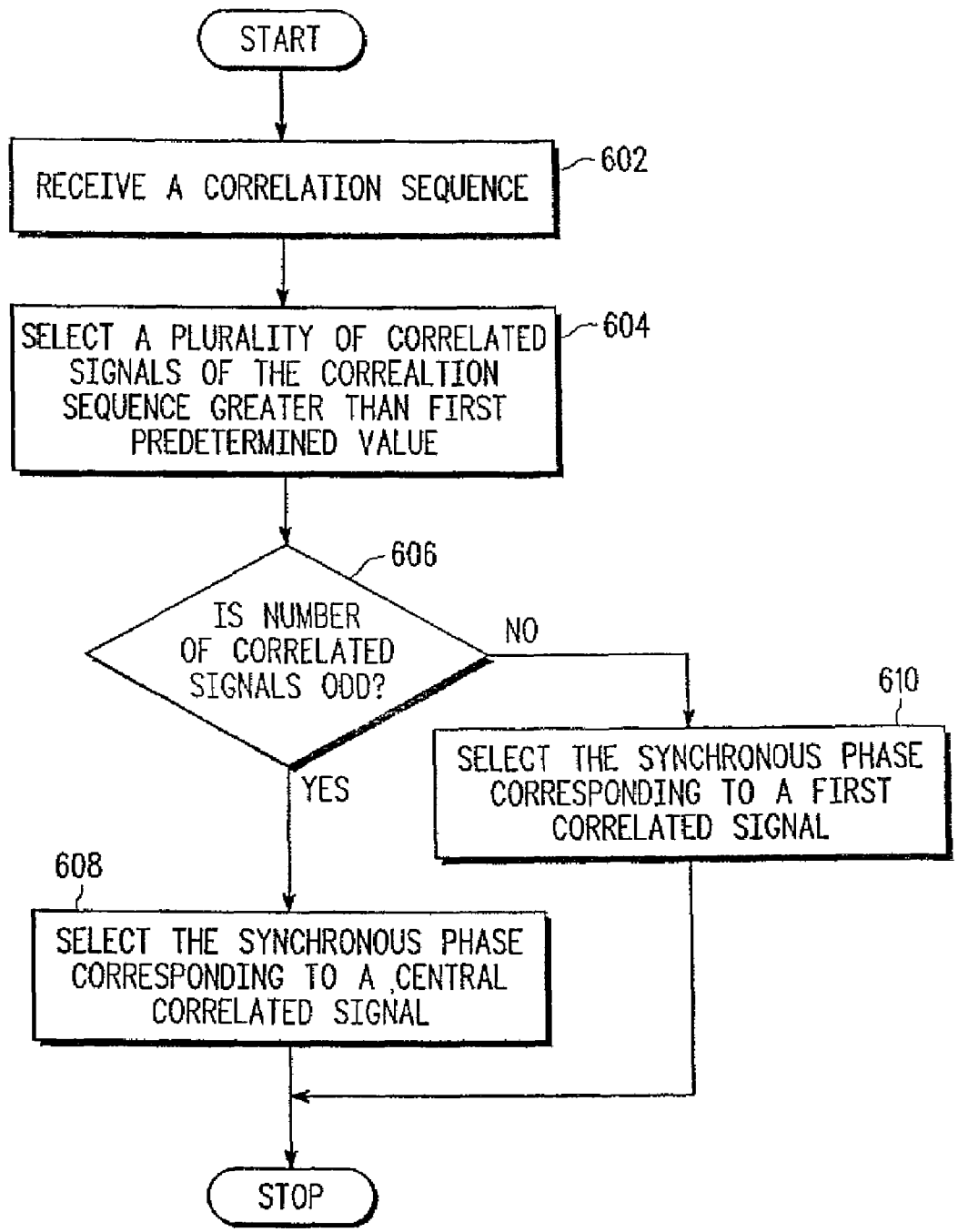
FIG. 6 shows a flowchart depicting a method of determining a synchronous phase in accordance with yet another embodiment of the present invention.

FIG. 6 is a flowchart depicting a method of determining the synchronous phase in accordance with yet another embodiment of the present invention. At step 602, the signal selection unit 108 receives the correlation sequence. At step 604, one or more correlated signals of the correlation sequence that are greater than a first predetermined value are selected by the signal selection unit 108. Typically, the one or more selected correlated signals are contiguous. The first predetermined value is a threshold programmable through register.

At step 606, it is determined whether the number of the one or more selected correlated signals is odd. If it is determined at step 606 that the number of the one or more selected correlated signals is odd, then at step 608, a synchronous phase corresponding to a central one of the selected correlated signal is chosen by the bias-remover 110, such as by counting and dividing, as discussed above.

If it is determined at step 606 that the number of the one or more correlated signals is even, then at step 610, a synchronous phase corresponding to a first correlated signal is selected from the one or more correlated signals. In this embodiment, the synchronous phase is selected, based on the correlation values of an even set of the one or more correlated signals. The configuration parameter is determined for the first-central correlated signal and the second-central correlated signal. The bias-remover 110 determines the first sum, and the second sum based on the configuration parameter. In an embodiment, the synchronous phase corresponding to the first-central correlated signal is determined when the first sum is greater than the second sum. In another embodiment of the present invention, the synchronous phase corresponding to the second-central correlated signal is determined when the second sum is greater than the first sum.

In one embodiment of the present invention, when the first sum is equal to the second sum, the synchronous phase corresponding to the first-central correlated signal is selected when the synchronous phase corresponding to the second-central correlated signal was selected in a preceding selection of the synchronous phase. In this embodiment, the synchronous phase corresponding to the second-central correlated signal is selected if the synchronous phase corresponding to the first-central correlated signal was selected in the preceding selection of the synchronous phase.

In another embodiment of the present invention, when the first sum is equal to the second sum, a first count and a second count are determined. In this embodiment, the synchronous phase corresponding to the first-central correlated signal is selected if the first count is greater than the second count. The synchronous phase corresponding to the second-central correlated signal is selected when the second count is greater than the first count.

In yet another embodiment of the present invention, when the first count is equal to the second count, the synchronous phase corresponding to the first-central correlated signal is selected if the synchronous phase corresponding to the second-central correlated signal was selected in a preceding selection of the synchronous phase. In this embodiment, the synchronous phase corresponding to the second-central correlated signal is selected if the synchronous phase corresponding to the first-central correlated signal was selected in the preceding selection of the synchronous phase.

In an embodiment of the present invention, a re-correlation sequence is received when the correlation value of each of the correlated signals of the correlation sequence is less than the first predetermined value. The re-correlation sequence is received by the signal-selection unit 108.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method of determining a synchronous phase, comprising the steps of:
   receiving a correlation sequence;
   selecting one or more correlated signals of the correlation sequence; and
   selecting the synchronous phase corresponding to a central correlated signal from the selected one or more correlated signals when the number of the selected one or more correlated signals is odd.

2. The method of determining the synchronous phase of claim 1, further comprising the step of:
   selecting the synchronous phase corresponding to a first correlated signal from the selected one or more correlated signals when the number of the selected one or more correlated signals is even.

3. The method of determining the synchronous phase of claim 2, wherein for the step of selecting the synchronous phase when the number of the selected one or more correlated signals is even, the synchronous phase is selected based on correlation values of an even set of the selected one or more correlated signals.

4. The method of determining the synchronous phase of claim 3, wherein the step of selecting the synchronous phase corresponding to the first correlated signal further comprises the steps of:
   determining a first-central correlated signal and a second-central correlated signal from the selected one or more correlated signals;
   determining a configuration parameter for the first-central correlated signal and the second-central correlated signal;
   determining a first sum that is a sum of correlation values of a first set of correlated signals from the even set of correlated signals, wherein the first set of correlated signals comprises correlated signals preceding the first-central correlated signal and the number of correlated signals in the first set of correlated signals is based on the configuration parameter;
   determining a second sum that is a sum of correlation values of a second set of correlated signals from the even set of correlated signals, wherein the second set of correlated signals comprises correlated signals succeeding the second-central correlated signal and the number of correlated signals in the second-set of correlated signals is based on the configuration parameter;

determining the synchronous phase corresponding to the first-central correlated signal when the first sum is greater than the second sum; and determining the synchronous phase corresponding to the second-central correlated signal when the second sum is greater than the first sum.

5. The method of determining the synchronous phase of claim 4, wherein the step of selecting the synchronous phase corresponding to the first correlated signal further comprises the step of:

determining the synchronous phase corresponding to one of the first-central correlated signal and the second-central correlated signal, when the first sum is equal to the second sum, wherein the synchronous phase corresponding to the first-central correlated signal is selected when the synchronous phase corresponding to the second-central correlated signal was determined in a preceding selection of the synchronous phase, and the synchronous phase corresponding to the second-central correlated signal is selected when the synchronous phase corresponding to the first-central correlated signal was determined in the preceding selection of the synchronous phase.

6. The method of determining the synchronous phase of claim 3, wherein the step of selecting the synchronous phase corresponding to the first correlated signal further comprises the steps of:

determining a first-central correlated signal and a second-central correlated signal from the selected one or more correlated signals;

determining a first count that is a number of correlated signals of a first set of the selected one or more correlated signals having correlation values greater than a predetermined threshold value;

determining a second count that is a number of correlated signals of a second set of the selected one or more correlated signals having correlation values greater than the predetermined threshold value;

determining the synchronous phase corresponding to the first-central correlated signal when the first count is greater than the second count; and determining the synchronous phase corresponding to the second-central correlated signal when the second count is greater than the first count.

7. The method of determining the synchronous phase of claim 6, wherein when the first count is equal to the second count, the synchronous phase corresponding to the first-central correlated signal is selected when the synchronous phase corresponding to the second-central correlated signal was determined in a preceding selection of the synchronous phase, and the synchronous phase corresponding to the second-central correlated signal is selected when the synchronous phase corresponding to the first-central correlated signal was determined in the preceding selection of the synchronous phase.

8. The method of determining the synchronous phase of claim 6, further comprising the step of:

determining a configuration parameter for the first-central correlated signal and the second-central correlated signal wherein when the first count is equal to the second count, the synchronous phase selection as one of the first-central and second-central correlated signals is based on the configuration parameter.

9. The method of determining the synchronous phase of claim 2, further comprising receiving a re-correlation sequence when the correlation value of each of the selected one or more correlated signals is less than a predetermined threshold value.

10. The method of determining the synchronous phase of claim 2, wherein the selected one or more correlated signals are contiguous.

11. The method of determining the synchronous phase of claim 1, wherein prior to receiving the correlation sequence the method comprises:

receiving a synchronization sequence comprising a plurality of bits;

obtaining a sampled sequence by sampling the synchronization sequence, wherein each of the bits of the sampled sequence corresponds to one bit of the synchronization sequence; and correlating the sampled sequence with a predefined sequence to generate the correlation sequence.

12. A method of determining a synchronous phase from a correlation sequence, the method comprising the steps of:

receiving a correlation sequence;

selecting a plurality of blocks of correlated signals of the correlation sequence;

selecting the synchronous phase corresponding to a first correlated signal from a central block of the plurality of blocks based on a first predefined criteria when a number of the plurality of blocks is odd; and selecting the synchronous phase corresponding to a second correlated signal from one of a first-central block and a second-central block based on a second predefined criteria when a number of the plurality of blocks is even.

13. The method of determining the synchronous phase of claim 12, wherein the selected correlated signals of each block are contiguous.

14. A method of determining a synchronous phase from a correlation sequence, the method comprising the steps of:

receiving the correlation sequence;

selecting one or more correlated signals of the correlation sequence, wherein the selected one or more correlated signals are greater than a first predetermined value;

selecting the synchronous phase corresponding to a central correlated signal from the selected one or more correlated signals when a number of the selected one or more correlated signals is odd; and selecting the synchronous phase corresponding to a first correlated signal from the selected one or more correlated signals when the number of the selected one or more correlated signals is even.

15. The method of determining a synchronous phase from a correlation sequence of claim 14, wherein the step of selecting the synchronous phase when the number of the selected one or more correlated signals is even, further comprises the steps of:

determining a first-central correlated signal and a second-central correlated signal from the selected one or more correlated signals;

determining a first sum that is a sum of correlation values of a first set of correlated signals, wherein the first set of correlated signals comprises correlated signals preceding the first-central correlated signal;

determining a second sum that is a sum of correlation values of a second set of correlated signals, wherein the second set of correlated signals comprises correlated signals succeeding the second-central correlated signal;

selecting the synchronous phase corresponding to the first-central correlated signal when the first sum is greater than the second sum; and selecting the synchronous phase corresponding to the second-central correlated signal when the second sum is greater than the first sum.

16. The method of determining a synchronous phase from a correlation sequence of claim 15, further comprising the step of:

determining a configuration parameter for the first-central correlated signal and the second-central correlated signal, wherein the number of correlated signals in the first set of correlated signals is based on the configuration parameter and the number of correlated signals in the second-set is based on the configuration parameter

17. The method of determining the synchronous phase of claim 15, wherein the step of selecting the synchronous phase when the number of the selected one or more correlated signals is even further comprises the step of:

determining the synchronous phase corresponding to one of the first-central correlated signal and the second-central correlated signal, when the first sum is equal to the second sum, wherein the synchronous phase corresponding to the first-central correlated signal is selected when the synchronous phase corresponding to the second-central correlated signal was determined in a preceding selection of the synchronous phase, and the synchronous phase corresponding to the second-central correlated signal is selected when the synchronous phase corresponding to the first-central correlated signal was determined in the preceding selection of the synchronous phase.

18. The method of determining the synchronous phase of claim 14, wherein the step of selecting the synchronous phase when the number of the selected one or more correlated signals is even further comprises the steps of:

determining a first-central correlated signal and a second-central correlated signal from the selected one or more correlated signals;

determining a first count that is a number of correlated signals of a first set of the selected one or more correlated signals having correlation values greater than a predetermined threshold value;

determining a second count that is a number of correlated signals of a second set of the selected one or more correlated signals having correlation values greater than the predetermined threshold value;

determining the synchronous phase corresponding to the first-central correlated signal when the first count is greater than the second count; and determining the synchronous phase corresponding to the second-central correlated signal when the second count is greater than the first count.

19. The method of determining the synchronous phase of claim 18, wherein when the first count is equal to the second count, the synchronous phase corresponding to the first-central correlated signal is selected when the synchronous phase corresponding to the second-central correlated signal was determined in a preceding selection of the synchronous phase, and the synchronous phase corresponding to the second-central correlated signal is selected when the synchronous phase corresponding to the first-central correlated signal was determined in the preceding selection of the synchronous phase.

20. The method of determining the synchronous phase of claim 14, wherein prior to receiving the correlation sequence the method comprises:

receiving a synchronization sequence comprising a plurality of bits;

obtaining a sampled sequence by sampling the synchronization sequence, wherein each of the bits of the sampled sequence corresponds to one bit of the synchronization sequence; and correlating the sampled sequence with a predefined sequence to generate the correlation sequence.

* * * * *